United States Patent [19]

Hope et al.

[11] 4,313,668

[45] Feb. 2, 1982

[54] CONTROL CIRCUIT FOR A FILM PROCESSING APPARATUS

[76] Inventors: Henry F. Hope, 3192 Huntingdon Rd., Huntingdon Valley, Pa. 19006; Stephen F. Hope, 2321 Wyandotte Rd., Willow Grove, Pa. 19090

[21] Appl. No.: 935,527

[22] Filed: Aug. 21, 1978

Related U.S. Application Data

[60] Continuation-in-part of Ser. No. 756,556, Jan. 3, 1977, Pat. No. 4,171,940, which is a continuation-in-part of Ser. No. 692,196, Jun. 2, 1976, Pat. No. 4,130,385, which is a division of Ser. No. 530,685, Dec. 9, 1974, Pat. No. 3,966,868.

[51] Int. Cl.[3] .......................... G03D 3/08; B29C 3/00

[52] U.S. Cl. .................................. 354/319; 425/152; 425/156; 425/167; 425/396

[58] Field of Search ............... 354/297, 298, 313, 314, 354/319, 320, 321, 322; 425/136, 149, 150, 151, 152, 156, 162, 167, 396, 394; 264/286, 238; 352/237; 96/78

[56] References Cited

U.S. PATENT DOCUMENTS

| | | | |
|---|---|---|---|
| 910,791 | 1/1909 | Dahly | 425/369 |
| 1,420,060 | 6/1922 | Rubin | 425/369 |
| 1,587,462 | 6/1926 | Adams et al. | 264/324 |
| 1,629,743 | 5/1927 | Scott | 425/369 |
| 1,748,389 | 2/1930 | Marcel | 425/369 |
| 2,105,238 | 1/1938 | Wittel | 96/78 X |
| 2,114,187 | 4/1938 | Howell | 96/78 |
| 2,218,227 | 10/1940 | Winnek | 425/367 |
| 2,309,755 | 2/1943 | Davis | 425/140 |
| 2,484,712 | 10/1949 | Jobst | 425/136 |
| 3,242,533 | 3/1966 | Wintriss | 425/136 |
| 3,256,566 | 6/1966 | Campbell | 425/336 |
| 3,292,208 | 12/1966 | Wood | 425/367 |
| 3,419,937 | 1/1969 | Bally | 425/369 |
| 3,438,837 | 4/1969 | Travis | 425/369 |
| 3,471,292 | 10/1969 | Ludwig | 96/78 |
| 3,516,116 | 6/1970 | Ladyjenski | 264/286 |
| 3,545,971 | 12/1970 | Barnes et al. | 96/48 |
| 3,635,609 | 1/1972 | Balamuth | 425/396 |
| 3,839,040 | 10/1974 | Goldstein | 96/48 A |
| 4,021,179 | 5/1977 | Pira et al. | 425/367 |

FOREIGN PATENT DOCUMENTS

| | | | |
|---|---|---|---|
| 2155 | of 1908 | United Kingdom | 96/78 |

*Primary Examiner*—Joseph W. Hartary
*Assistant Examiner*—Alan Mathews
*Attorney, Agent, or Firm*—Weiser, Stapler & Spivak

[57] ABSTRACT

A coiled roll of film, which exhibits curling, is provided with longitudinal corrugations at its leading edge by a film processing apparatus, thereby providing a straight film edge well adapted for insertion into a film development machine without requiring the use of a separate leader. In the film processing apparatus, which comprises a pair of grooved, horizontally opposed platens which, upon insertion of a film therebetween, contact each other, impressing corrugation into the film, and then automatically retract to permit removal of the worked film edge from between the platens, a safety switch is provided to enable retraction of the platens, should automatic retraction not occur, to assure that the film end may be removed from the apparatus after it has been worked without being damaged.

8 Claims, 4 Drawing Figures

CONTROL CIRCUIT FOR A FILM PROCESSING APPARATUS

This application is a continuation-in-part of copending application Ser. No. 756,556, filed Jan. 3, 1977 now U.S. Pat. No. 4,171,940, which in turn is a continuation-in-part of copending application Ser. No. 692,196, filed June 2, 1976, now U.S. Pat. No. 4,130,385, which in turn is a division of application Ser. No. 530,685, filed Dec. 9, 1974, now U.S. Pat. No. 3,966,868 issued June 29, 1976.

This invention relates generally to the field of processing photographic films, and in particular to an apparatus for the processing of film for insertion into an automatic film development machine.

In the use of automatic development machines, comprising a plurality of tanks through which film is directed by a series of rollers, it was found that the transportation through the machine of a roll of film which had previously been coiled often led to less than satisfactory results, at times to the point of jamming in the machine, due to the curl exhibited by the leading edge of the film. The remedy for such a problem was found to be the placement, at the leading edge of the roll of film, of a straight leader, which could be properly guided through the development machine.

In our application Ser. No. 756,556, there is shown a film processing apparatus which provides a coiled roll of film with such a straight leader, without requiring the use of separate material as did previous workers in the art. To this end, an apparatus is provided which has a pair of opposing, grooved platens, between which is placed the leading edge of a roll of film. Upon sensing this, the platens close against each other, thereby imparting corrugations in the leading edge of the film. Thereafter, the platens retract to their spread apart position, whereupon the worked leading edge may be withdrawn from the processing apparatus. The film may then be inserted into an automatic development machine for development, the corrugations imparted to the leading edge of the film serving to straighten that edge, providing the straight leader desired for proper operation.

The above apparatus has been found to work well in providing a coiled roll of film with a leader which is capable of removing the potential for jamming previously encountered when such a film was inserted into an automatic development machine. Moreover, the apparatus has worked quite reliably to that end.

However, in an effort to optimize reliability, we have determined that a possibility exists that at some point in operation the two platens, upon closing against each other, could fail to reopen. This would cause the film to jam inside the processing apparatus, which could result in damage to that film, or at least a part of that film. This possibility is further complicated by the fact that film processing is accomplished in a dark-room environment. Thus, should jamming occur, an operator would be hard pressed to free the jammed film without turning on the lights, which would surely expose the film being processed. It has therefore been determined that a fail-safe should be provided to account for such a possible malfunction.

SUMMARY OF THE INVENTION

This invention relates generally to the field of processing photographic films, and in particular to an improved control circuit for an apparatus capable of processing film for insertion into an automatic film development machine.

The film processing apparatus disclosed in our application Ser. No. 756,556 provides a pair of horizontally opposed, grooved platens which are maintained in a normally opened condition. Upon insertion of the leading edge of a coiled roll of film therebetween, the platens are made to close upon each other, imparting to the film placed therebetween a plurality of longitudinal corrugations. After the film is worked the platens are made to retract, at which point the worked film edge may be removed from the apparatus for insertion into an automatic development machine. This operation may be repeated as desired.

To regulate closure and opening of the platens the film processing apparatus is provided with a control circuit which senses the presence of a film edge between the platens, whereupon closure of the platens is accomplished, and which re-opens the platens at a predetermined time after closure.

In accordance with the present invention, the control system which regulates the film processing apparatus is provided with a manually operated switch which is adapted to override the control circuit and cause the platens to re-open in the unlikely event that they should jam in a closed position. By placing this switch in a prominent position, an operator, even in a darkroom environment, is provided with a convenient means for freeing platens which have become jammed closed, permitting the safe removal of the film from the processing apparatus for subsequent insertion into the film developing machine.

Accordingly, it is an object of this invention to provide an apparatus which will process film for insertion into an automatic development machine, and which will operate with improved reliability.

It is another object of this invention to provide a film processing apparatus, capable of preparing the leading edge of a coiled roll of film for insertion into an automatic development machine, which will assure preparation of the leading edge without damage to the film.

It is another object of this invention to provide a film processing apparatus, of the type having two opposing platens which close upon each other to impart corrugations to the leading edge of a coiled roll of film and thereby straighten that leading edge, and then re-open to allow removal of the film therefrom, which is adapted to prevent jamming of the platens in a closed position.

It is another object of this invention to provide a film processing apparatus, of the type having two opposing platens which close upon each other to impart corrugations in the leading edge of a coiled roll of film and thereby straighten that leading edge, and then re-open to allow removal of the film therefrom, which will enable an operator to free platens which have become jammed in a closed position while in a darkroom environment.

These objects and others will become apparent to those skilled in the art from the following disclosure of the preferred embodiment of the invention taken in conjunction with the drawings provided in which like reference characters refer to similar parts throughout the several views provided, in which:

DESCRIPTION OF THE PREFERRED EMBODIMENT OF THE INVENTION

Figure 1A:
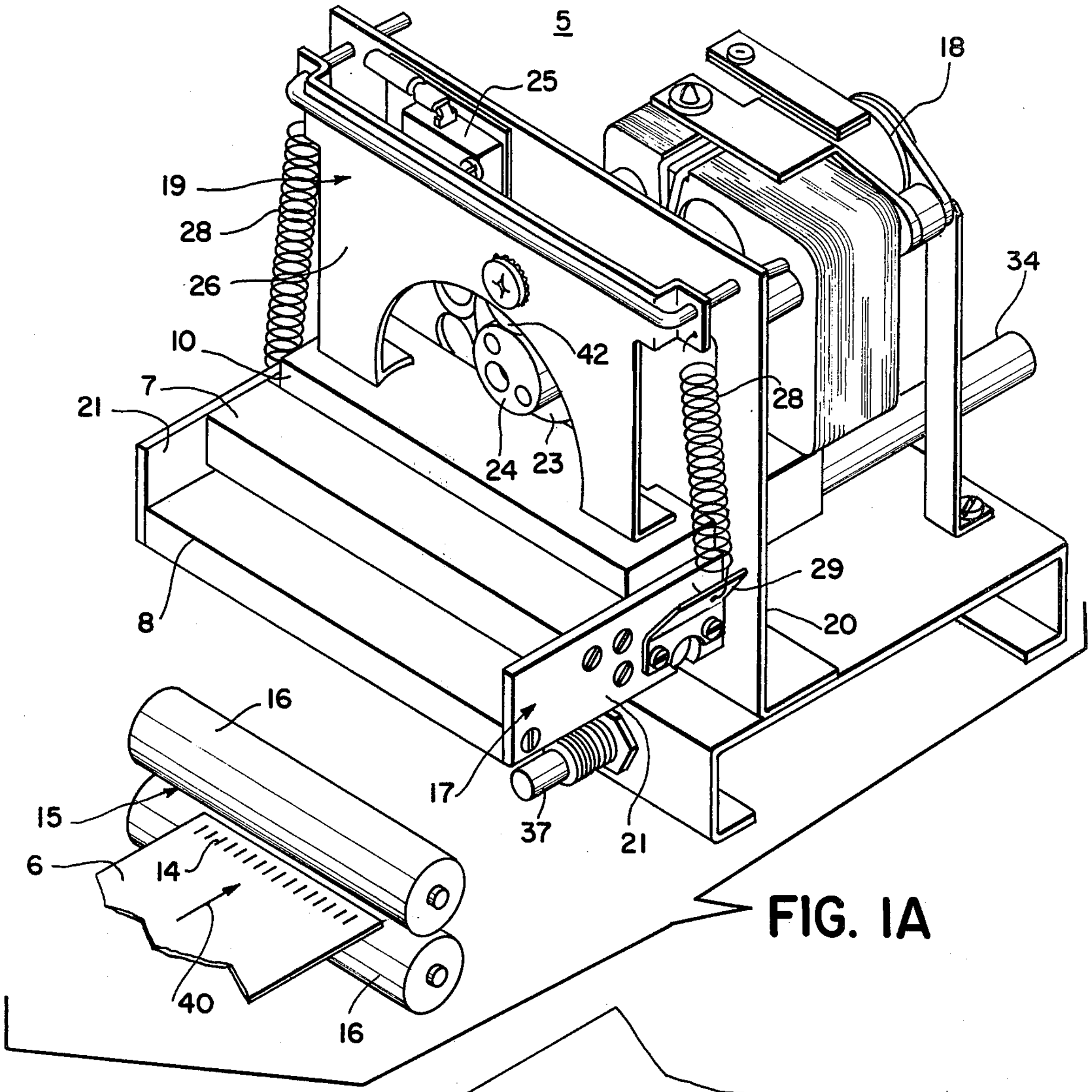
FIG. 1*a* is an enlarged, isometric view of a portion of the machine of FIG. 1, showing certain internal construction features of the machine input and the film processing apparatus.

Although specific terms are used in the following description for the sake of clarity, these terms are intended to refer only to the particular structure of the invention selected for illustration in the drawings, and are not intended to define or limit the scope of the invention.

Figure 1:
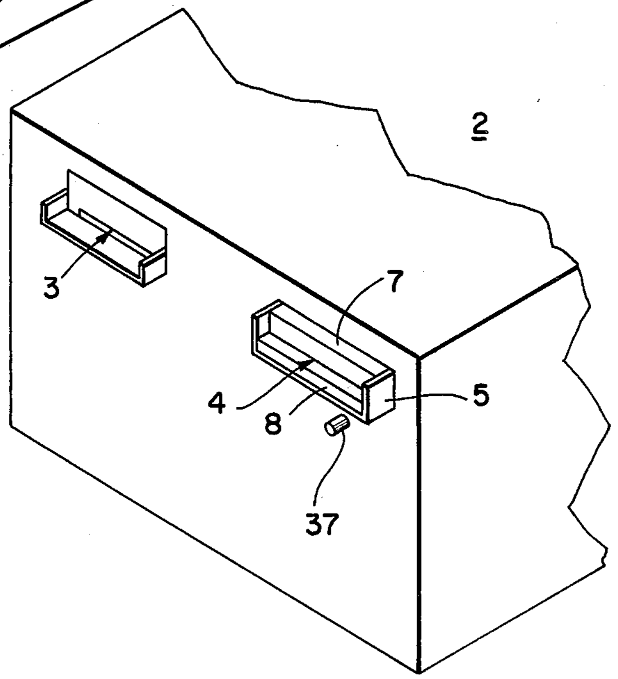
FIG. 1 is a fragmentary, isometric view of a film developing machine showing the externally visible portions of the equipment used in practicing the present invention, specifically the film processing apparatus and the input to the machine itself.

Referring to FIG. 1, there is shown the front face 1 of a film development machine, generally designated by the numeral 2. The front face 1 is provided with two access areas 3, 4, a first access area 3 communicating with the remainder of the film developing machine (not shown), and a second access area 4 communicating with the film processing apparatus 5.

Film developing machines ordinarily comprise a series of adjacent tanks, and a plurality of roller racks which are capable of directing a strip of film through the series of tanks in a manner which accomplishes development of the strip of film. To perform this function a number of rollers are required, some of which direct the strip through a particular tank and some of which are positioned to turn the film through a given angle for direction to another area of the machine.

Generally a strip of film is stored in a coiled form, both before and after exposure. As a result, the film will exhibit a tendency to curl. It has been found that such a curl can cause the film to wrap around the rollers of the machine rather than to proceed through those rollers, at times causing the strip of film to improperly thread through the machine, even to the point of jamming in some cases. It therefore becomes desirable to remove the curl exhibited by such a strip of film, along its leading edge 6, prior to its insertion into the access 3 of the development machine, to provide a straight leading edge which will properly thread through the development machine. To accomplish this, an operator, provided with such a strip of film, would proceed as follows.

The leading edge 6 of a strip of film would be longitudinally inserted into the access 4 of the film processing apparatus 5 in the direction of the arrow 39 illustrated in FIG. 1. To assist in this operation, which would generally be performed in a darkroom environment, the processing apparatus 5 is provided with an upper guide 7 and a lower guide 8.

Figure 2:
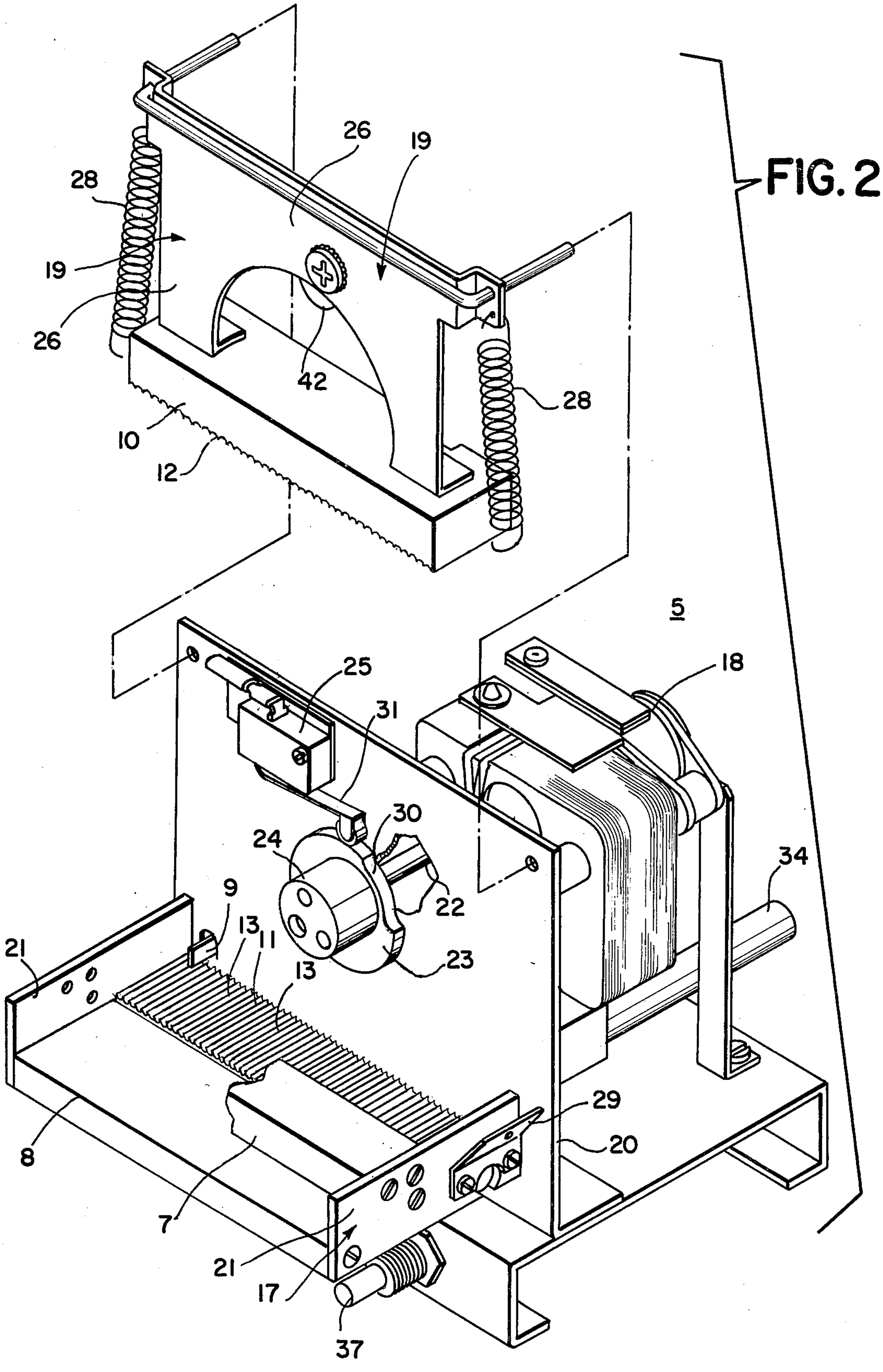
FIG. 2 is an exploded, isometric view of the film processing apparatus.

The leading edge 6 is directed through the access 4 and into contact with an actuator 9, best illustrated in FIG. 2, which is used to initiate operation of the processing apparatus 5. Upon initiation of operation, an upper platen 10 is moved into contact with a lower platen 11, thereby sandwiching the leading edge 6 of the strip of film therebetween. As is best illustrated in FIG. 2, the platens 10, 11 are provided with grooves 12, 13 running longitudinally within the access 4. The grooves 12 of the upper platen 10 are configured to intermesh with the grooves 13 of the lower platen 11. In this manner the leading edge 6 of the strip of film is deformed, being provided with longitudinally extending corrugations 14 as the two platens 10, 11 are brought into contact with each other. It has been found that such corrugations 14 cause the leading edge 6 of the strip of film to straighten. This removes the curl exhibited by such films along their leading edge 6.

After working the leading edge 6 of the strip of film, the platens 10, 11 are caused to move back to their open position. The leading edge 6 is then capable of being removed from the access 4 for processing through the film development machine. To accomplish this the operator would then move the leading edge 6 from the processing apparatus 5 to the access 3 of the film development machine 2, for insertion therein. The leading edge 6, upon insertion into the access 3, would be directed toward the nip 15 defined between a first pair of rollers 16 in the direction of the arrow 40, as illustrated in FIG. 1*a*. The corrugations 14 impressed in the leading edge 6 will cause that leading edge 6 to straighten, thus providing a straightened leading edge 6 for insertion between the nip 15 of the rollers 16, and which will properly thread through the remainder of the development machine.

The strip of film is then processed through the development machine 2, being guided therethrough by additional rollers as previously mentioned. Providing a straight leading edge 6 allows the strip of film to be directed through the rollers without jamming, since the leading edge no longer will tend to wrap around the rollers, rather than proceeding through them. As the leading edge 6 proceeds through the system of rollers of the development machine 2, the remainder of the film will follow, thereby safely developing the entire strip of film.

A processing apparatus 5 capable of providing the above function will now be described in greater detail, such an apparatus being illustrated in FIGS. 1*a* and 2. The apparatus 5 generally comprises a lower platen assembly 17, a motor 18 attached to the lower platen assembly 17, and an upper platen assembly 19 movably connected to the lower platen assembly 17.

The lower platen assembly 17 has a mounting plate 20 to which the following elements are attached. A motor 18 is attached to the mounting plate 20 so as to move the platens 10, 11 toward and away from each other in a manner to be more fully described below. A lower platen 11, having transverse grooves 13, is connected along the bottom of the mounting plate 20. Film guides 7, 8, which may be of a plastic, wood or other suitable material, are connected outboard from the platen 11, both above and below the plane defined by the grooves 13 of the platen 11. The guides 7, 8 combine with sides 21, which are also connected to the mounting plate 20, to assist in guiding the leading edge 6 of a strip of film into the processing apparatus 5 and between the platens 10, 11.

The upper platen assembly 19 has an upper platen 10, provided with grooves 12 which are configured to intermesh with the grooves 13 of the lower platen 11, and a means for separating and urging together the platens 10, 11, in order to provide corrugations 14 to a strip of film placed between the platens 10, 11. The upper platen assembly 19 is positioned over the platen 11, and between the upper guide 7 and the mounting plate 20, providing an enclosed area into which the leading edge 6 of a strip of film is to be inserted.

The motor 18 is mounted so that its shaft 22 extends through the mounting bracket 20, facing toward the platens 10, 11, and into engagement with the means for separating and urging together the platens 10, 11, and therefore, the upper platen assembly 19. The end of the shaft 22 is provided with a cam 23 and eccentric 24 which control operation of the apparatus 5 as follows.

The cam 23 is provided with a detent 30, which combines with a microswitch 25 to limit operation of the apparatus 5. The eccentric 24 combines with a roller 42 connected to the top of an arch shaped bracket 26, to provide a means for separating and urging together the platens 10, 11.

In operation, the leading edge 6 of a strip of film is inserted between the guides 7, 8 of the lower platen assembly 17. Forward movement of the leading edge 6 is limited by mounting bracket 20, and the actuator 9, shown in FIG. 2. As the leading edge 6 contacts the actuator 9, a microswitch 27 is closed. This initiates operation of the apparatus 5, by operating the motor 18. As the motor 18 is operated, the shaft 22 is caused to turn, along with the cam 23 and eccentric 24 mounted thereon.

As the eccentric 24 is caused to rotate away from beneath the arched bracket 26, the upper platen 10 is allowed to move toward the lower platen 11 as a result of the force exerted by the springs 28 which are connected between the arched bracket 26 of the upper platen assembly 19 and attaching means 29 affixed to the lower platen assembly 17. The leading edge 6 of the film is thereby clamped between the platens 10, 11 to impress the desired corrugations 14 therein.

A heater 32 is preferably placed within the lower platen 11 to heat the platen 11 and thereby assist in providing corrugations 14 to the leading edge 6. To prevent damage to the film, a thermostat 33 is provided to limit the heat produced by the heater 32. The thermostat 33 may be adjusted through the adjustment tube 34.

As rotation of the shaft 22 continues, the eccentric 24 will again be brought into engagement with the roller 42 connected to the arched bracket 26, eventually raising the upper platen 10 out of contact with the lower platen 11. Rotation of the shaft 22 will continue until the detent 30 of the cam 23 aligns with the lever 31 which operates the microswitch 25. When this occurs, operation of the motor is stopped, and the worked leading edge 6 of the strip of film may be removed from between the platens 10, 11.

Figure 3:
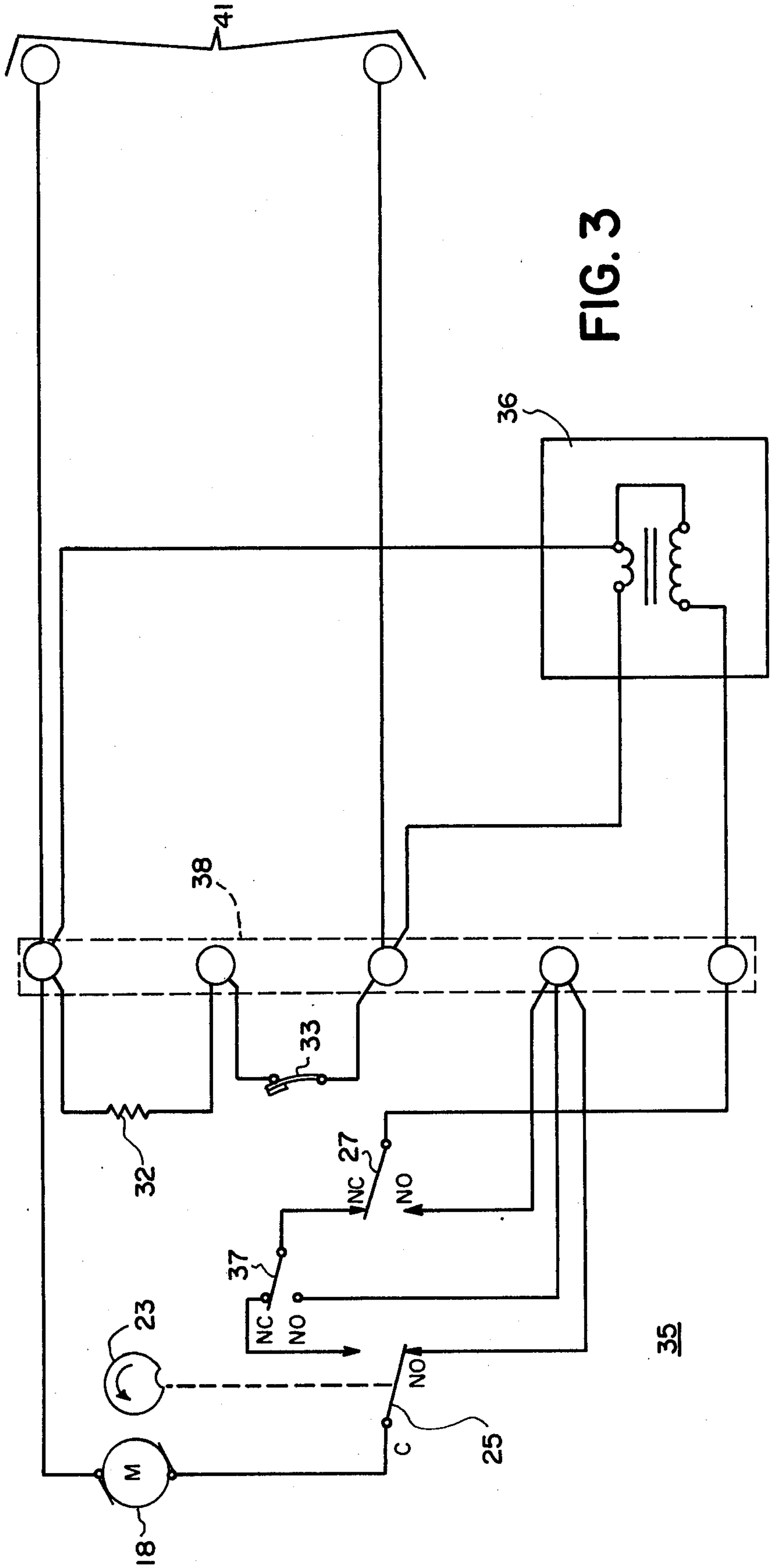
FIG. 3 is a schematic diagram of the control circuitry used to regulate operation of the film processing apparatus.

FIG. 3 illustrates an electrical control circuit 35 which is capable of producing the above series of steps. The control circuit 35 is adapted to draw power from the development apparatus 2, as shown at 41. The power 41 is placed directly across a series combination of the heater 32 and thermostat 33 for their operation, and across a transformer 36 to provide power for operation of the motor 18. The several terminals of the block 38 are provided merely to facilitate interconnection of the respective components of the control circuit 35.

Initially, upon placement of the leading edge 6 of a strip of film between the guides 7, 8, the microswitch 27 is caused to move from its normally closed position to its normally open position. The microswitch 25, operated by the cam 23, is already in its normally open position due to pressure placed upon that switch by the lever 31, the cam being positioned so that the lever 31 is out of the detent 30 at that point in operation. This closes a current path to the motor 18 which initiates movement of the shaft 22 and, accordingly, closure of the platens 10, 11. As the platens 10, 11 close upon each other, the leading edge 6 of a strip of film is provided with a plurality of longitudinally extending corrugations 14.

The motor 18 continues to operate after closure of the platens 10, 11, thereby rotating the cam 23 fully around. This serves to re-open the platens 10, 11 in the manner previously described. The motor 18 will continue to operate until the detent 30 of the cam 23 is moved into position adjacent to the lever 31. When this happens the lever 31 drops into the detent 30 causing the microswitch 25 to switch to its normally closed position. This opens the current path to the motor 18 causing that motor 18 to stop. The film may then be removed from between the platens 10, 11, which are now in their open position.

As the film is removed, the actuator 9 is allowed to return to its original position, causing the microswitch 27 to return to its normally closed position. This creates a second current path to the motor 18 which will again be caused to operate. Operation of the motor 18 will continue until the detent 30 is moved out from alignment with lever 31, thereby returning the microswitch 27 to its normally open position. The flow of current to the motor 18 is then prevented, stopping the motor 18, and resetting the apparatus 5 for subsequent use.

The above circuitry provides for reliable operation of the processing apparatus 5. A careful operation will be able to obtain excellent results in a straightforward manner. Nevertheless, it has been determined that a potential exists for the platens 10, 11 to jam closed should the operator err in placement of the film between the platens 10, 11. This potential problem arises as follows.

Operation of the apparatus 5 is essentially controlled by the actuator 9, and the microswitch 27 connected thereto. During the period of time when closure occurs, rotation of the shaft 22 is regulated by contact between the actuator 9 and an abutting leading edge 6. Should contact between these two components be lost, due to accidental movement of the film's leading edge 6 within the access 4, operation of the motor 18 would cease, stopping rotation of the shaft 22 and, thus, closure of the platens 10, 11. All that need be done to continue operation is to realign the leading edge 6 with the actuator 9. Operation continues as previously described.

However, there exists a possibility that such misalignment could occur when the platens 10, 11 are near their closed position. At this point in time, should misalignment occur, it is conceivable that, due to inertia, the motor 18 would continue to operate just long enough to fully close the platens 10, 11. At this point the platens 10, 11 would be locked shut, with the misaligned film trapped between them. Since realignment cannot take place, the film would become jammed in the apparatus 5.

To overcome this potential problem, a safety switch 37 is provided. The wiper and normally closed contact of the switch 37 are connected in series between the normally closed contacts of the microswitches 25, 27. Under normal conditions, the switch 37 remains dormant and the circuit 35 operates as previously described. However, should jamming of the platens 10, 11 occur, the switch 37 operates to overcome the problem.

To this end, the normally open contact of the switch 37 is connected to the normally open contact of both microswitches 25, 27. In this manner, even though the microswitch 27 is jammed in its normally closed position, due to film misalignment, an alternate current path, which serves as a bypass, is provided to the motor 18, by actuation of the switch 37. Actuation of the switch 37 causes that switch 37 to assume its normally open configuration which completes a current path through the microswitch 25 to momentarily operate the motor 18 and thus bring the platens 10, 11 out of contact with each other. Thereafter, release of the pushbutton switch 37 allows the operator to realign the leading edge 6 and thus proceed through the remainder of the corrugation cycle, in accordance with the above described procedure, after which the leading edge 6 of the strip of film can safely be removed from between the platens 10, 11.

To permit an operator to easily reach the safety switch 37, it is preferable to place the switch 37 immediately beneath the access 4 to the apparatus 5, as illustrated in FIG. 1. Since the operator's hands will be nearby, operation of the safety switch 37 is quickly and easily permitted. In this manner an operator is able to continue cycling the apparatus 5, if ever necessary, to obtain the release of a strip of film which may have become jammed. For operator convenience it is preferred that the switch 37 be a pushbutton type, so that actuation and release are easily accomplished, although any of several known types of switches may be utilized if deemed proper.

Although the switch 37 is primarily intended for use as a fail safe, it is also possible to utilize the switch 37 to operate the processing apparatus 5 though its entire cycle. Operation of the switch 37 closes a current path to the motor 18 as previously described. Such a current path may be maintained while the platens 10, 11 close upon each other, and then reopen, whereupon the corrugated film edge 6 may be withdrawn from the machine. Thus the switch 37 provides the operator with a choice between automatic or manual operation of the processing apparatus 5, manual operation of the processing apparatus 5 permitting operation of the platens 10, 11 irrespective of their positions with respect to each other.

It will of course be understood that the above invention is capable of variation from the embodiment above described. For example, the switch 37 may be placed anywhere on the apparatus 2 which is convenient for the operator to reach. Moreover, if desired, a pressure pad (not shown) may be placed over the pushbutton switch to provide the operator with a larger surface to contact, further facilitating darkroom operation. It is even possible to provide the operator with a foot switch capable of producing the above described function, if desired.

The safety switch 37 previously described may also find applicability in connection with any one of several embodiments of the film processing apparatus 5, and not only the embodiment above described.

It may therefore be seen that the above disclosed invention serves well to accomplish the objects previously stated. It may also be seen that the above described invention may be embodied in other specific forms in addition to those above disclosed and therefore the disclosure made should be interpreted in an illustrative and not a limiting sense.

We claim:

1. In an apparatus for the processing of a curled leading edge of a coiled strip of film, the apparatus comprising a pair of platens, having grooves which combine to impress longitudinal corrugations into the leading edge of the film inserted therebetween, the platens being adapted to move from a non-contact position to a contact position, and then back to the non-contact position, and a means for moving the platens to their contact position upon the placement of the leading edge of film therebetween and to return the platens to their non-contact position at a preselected time thereafter, in response to signals from a control circuit, an improved control circuit comprising switching means capable of causing the platens to move either from a non-contact position to the contact position or from the contact position to a non-contact position irrespective of the position of the platens with respect to each other.

2. The apparatus of claim 1 in combination with a film development machine which uses rollers to transport the film strip through the machine, including input rollers defining a nip for receiving the film strip for transport through the machine, said machine having at least one face, wherein the combination has a first access located on the face of the machine which communicates with the nip of the rollers, thereby enabling insertion of the strip of film into the machine, a second access located on the face of the machine which communicates with the space defined between the platens of the film processing apparatus, thereby enabling the leading edge of a strip of film to be inserted into the apparatus so that the leading edge may be straightened, and said switching means being mounted on the face of the development machine and being operatively connected to the film processing apparatus to permit operation of the film processing apparatus and to continue operation of the film processing apparatus should the platens become jammed.

3. The apparatus of claim 2 wherein the switch is mounted on the face of the machine at a point near the second access to the processing machine.

4. The apparatus of claim 2 wherein the switch is mounted on the face of the machine at a point just beneath the second access.

5. The apparatus of claim 1 wherein the switching means is a pushbutton switch.

6. In an apparatus for the processing of a curled leading edge of a coiled strip of film, the apparatus comprising a pair of platens, having grooves which combine to impress longitudinal corrugations into the leading edge of the film inserted therebetween, the platens being adapted to move from a non-contact position to a contact position, and then back to the non-contact position, and a means for moving the platens to their contact position upon the placement of the leading edge of film therebetween and to return the platens to their non-contact position at a preselected time thereafter, in response to signals from a control circuit, an improved control circuit comprising switching means capable of causing the platens to move either from a non-contact position to the contact position or from the contact position to a non-contact position irrespective of the position of the platens with respect to each other, wherein the movement of the platens from a non-contact position to a contact position, or from a contact position to a non-contact position is responsive to the placement of a strip of film therebetween and, wherein the switching means is operatively connected to the control circuit to continue movement of platens which have become jammed in a closed position.

7. In an apparatus for the processing of a curled leading edge of a coiled strip of film, the apparatus comprising a pair of platens, having grooves which combine to impress longitudinal corrugations into the leading edge of the film inserted therebetween, the platens being adapted to move from a non-contact position to a contact position, and then back to the non-contact position, and a means for moving the platens to their contact position in response to the placement of the leading edge of film therebetween and to return the platens to their non-contact position at a preselected time thereafter, in response to signals from a control circuit, an improved control circuit comprising switching means capable of causing the platens to move either from a non-contact position to the contact position or from the contact position to a non-contact position irrespective of the position of the platens with respect to each other, wherein the movement of the platens from a non-contact position to a contact position, or from a contact position to a non-contact position is responsive to the placement of a strip of film therebetween, and wherein the switching means provides a bypass within the control circuit which is capable of causing the platens to move even though the edge responsive means and the platens would otherwise combine to prevent such movement.

8. In an apparatus for the processing of a curled leading edge of a coiled strip of film, the apparatus comprising a pair of platens, having grooves which combine to impress longitudinal corrugations into the leading edge of the film inserted therebetween, the platens being adapted to move from a non-contact position to a contact position, and then back to the non-contact position, and a means for moving the platens to their contact position upon the placement of the leading edge of film therebetween and to return the platens to their non-contact position at a preselected time thereafter, in response to signals from a control circuit, an improved control circuit comprising manual switching means capable of causing the platens to move either from a non-contact position to the contact position or from the contact position to a non-contact position irrespective of the position of the platens with respect to each other.

* * * * *